(12) United States Patent
Yang et al.

(10) Patent No.: US 7,551,685 B2
(45) Date of Patent: Jun. 23, 2009

(54) APPARATUS, METHODS AND ARTICLES OF MANUFACTURE FOR SIGNAL CORRECTION USING ADAPTIVE PHASE RE-ALIGNMENT

(75) Inventors: Yongwen Yang, Hillsboro, NJ (US); Carol Moy, Morristown, NJ (US); Christine DiVincenzo, Califon, NJ (US)

(73) Assignee: M/A-Com, Inc., Lowell, MA (US)

( * ) Notice: Subject to any disclaimer, the term of this patent is extended or adjusted under 35 U.S.C. 154(b) by 949 days.

(21) Appl. No.: 10/647,878

(22) Filed: Aug. 25, 2003

(65) Prior Publication Data

US 2005/0047520 A1 Mar. 3, 2005

(51) Int. Cl.
*H04L 25/03* (2006.01)
(52) U.S. Cl. .................................. 375/296
(58) Field of Classification Search ............. 375/295, 375/376, 296; 332/127, 128; 331/4, 25
See application file for complete search history.

(56) References Cited

U.S. PATENT DOCUMENTS

| | | | | |
|---|---|---|---|---|
| 4,630,315 | A | 12/1986 | Watkinson | 455/109 |
| 5,021,754 | A * | 6/1991 | Shepherd et al. | 332/128 |
| 5,633,893 | A | 5/1997 | Lampe et al. | 375/297 |
| 5,952,895 | A | 9/1999 | McCune, Jr. et al. | 332/128 |
| 6,011,815 | A | 1/2000 | Eriksson et al. | 375/296 |
| 6,094,101 | A | 7/2000 | Sander et al. | 331/17 |
| 6,101,224 | A | 8/2000 | Lindoff et al. | 375/300 |
| 6,140,882 | A | 10/2000 | Sander | 331/25 |
| 6,252,464 | B1 * | 6/2001 | Richards et al. | 331/4 |
| 6,255,912 | B1 | 7/2001 | Laub et al. | 331/25 |
| 6,515,553 | B1 * | 2/2003 | Filiol et al. | 332/127 |
| 6,621,876 | B2 | 9/2003 | Camp, Jr. et al. | 375/296 |
| 6,693,969 | B1 * | 2/2004 | Montalvo et al. | 375/259 |

(Continued)

FOREIGN PATENT DOCUMENTS

GB 2 247 368 2/1992

(Continued)

OTHER PUBLICATIONS

McMahill, Daniel R., Sodini, Charles G., A 2.5 Mb/s GFSK 5.0-Mb/s 4-FSK Automatically Calibrated sigma-delta Frequency Synthesizer, IEEE Journal Of Solid-State Circuits, vol. 37, No. 1, Jan. 2002, pp. 18-26.

*Primary Examiner*—Don N Vo (57) ABSTRACT

The invention is directed to a system for adaptively re-aligning a modulated output signal having an error component by generating a reference phase signal using a phase input signal; generating a sample phase signal from the output signal; comparing the reference and sample signals; and adaptively re-aligning any difference between the reference and sample signals to substantially reduce the error component. The invention may incorporate a sampling circuit for sampling the output signal to generate the sample signal; a digital phase locked loop for combining the phase input signal with a carrier wave to generate the reference signal and comparing them to generate a phase error signal; a reference filter for generating reference phase error information; a combining circuit for combining the phase error signal with the reference phase error information to generate a correction signal; and an adaptive gain control circuit for adaptively controlling gain in the correction signal to generate a final estimated error used to re-align the output signal with the phase input signal.

39 Claims, 4 Drawing Sheets

U.S. PATENT DOCUMENTS

| | | | |
|---|---|---|---|
| 6,701,134 B1 | 3/2004 | Epperson | 455/102 |
| 6,834,084 B2 | 12/2004 | Hietala | 375/296 |
| 6,844,788 B2 | 1/2005 | Chadwick | 332/159 |
| 2002/0090921 A1 | 7/2002 | Midtgaard et al. | 455/126 |
| 2002/0191728 A1* | 12/2002 | Hafez et al. | 375/376 |
| 2002/0196864 A1 | 12/2002 | Booth et al. | 375/296 |
| 2003/0031267 A1 | 2/2003 | Hietala | 375/295 |
| 2003/0073419 A1 | 4/2003 | Chadwick | 455/126 |
| 2003/0215025 A1 | 11/2003 | Hietala | 375/297 |
| 2003/0215026 A1 | 11/2003 | Hietala | 375/297 |
| 2004/0192369 A1 | 9/2004 | Nilson | 455/522 |
| 2004/0198257 A1 | 10/2004 | Takano et al. | 455/108 |
| 2004/0198258 A1 | 10/2004 | Tanaka et al. | 455/108 |
| 2004/0208157 A1 | 10/2004 | Sander et al. | 370/345 |
| 2004/0212445 A1 | 10/2004 | Haglan | 332/103 |
| 2004/0219891 A1 | 11/2004 | Hadjichristos | 455/102 |
| 2004/0263245 A1 | 12/2004 | Winter et al. | 330/10 |
| 2005/0064830 A1 | 3/2005 | Grigore | 455/127.4 |
| 2005/0110565 A1 | 5/2005 | Robinson | 330/124 R |
| 2005/0110568 A1 | 5/2005 | Robinson et al. | 330/151 |
| 2005/0122164 A1 | 6/2005 | Brandt et al. | 330/10 |
| 2005/0134396 A1 | 6/2005 | Pehlke et al. | 332/103 |

FOREIGN PATENT DOCUMENTS

| | | |
|---|---|---|
| WO | WO 01/20774 | 3/2001 |

* cited by examiner

APPARATUS, METHODS AND ARTICLES OF MANUFACTURE FOR SIGNAL CORRECTION USING ADAPTIVE PHASE RE-ALIGNMENT

FIELD OF THE INVENTION

The invention relates generally to electromagnetic processing, and more particularly, the invention relates to signal correction using adaptive phase re-alignment.

BACKGROUND OF THE INVENTION

Correcting errors that occur during the processing of electromagnetic waves and signals (hereinafter "waves") is sometimes difficult. These waves may be used for many different purposes. For example, they may be processed in order to convey intelligence, such as by attenuating and/or amplifying electromagnetic wave characteristics, for instance, as is seen when modulating amplitude, frequency or phase of an electrical current or radio frequency (RF) wave to transmit data. As another example, power may be conveyed along a wave in a controlled fashion by attenuating and/or amplifying electromagnetic wave characteristics, such as is seen when modulating voltage or current in a circuit. Moreover, the uses may be combined, such as when intelligence may be conveyed through a wave by processing power characteristics.

Because low frequency waves, such as 60 Hz power waves, may need different processing techniques than high frequency waves such as 24 GHz radar waves, it is common practice to use different components, with different characteristics, for different waves. For example, a switching semiconductor used within a computer for 60 Hz power waves has different power handling characteristics from a power semiconductor used in a 24 GHz radar system. Each of these systems may produce errors in the processed signal, however, due to errors that may be introduced into some of the characteristics of the electromagnetic wave during signal processing.

For example, in phase modulation systems, errors may occur in the phase of the output signal from errors introduced during the modulation process. In these wave processing systems and others, the processing system must oftentimes be calibrated during manufacturing and/or at periodic intervals during use to reduce the errors introduced into the signal during processing. Calibrating the processing system in this way requires that a system be taken out of service or causes delay and expense in manufacturing the system.

Thus, it would be beneficial to calibrate the system by adaptively processing in an ongoing basis during operation, to closely re-produce the desired characteristics of the electromagnetic input wave with predetermined (e.g., idealized) wave characteristics during wave processing. Accordingly, it would be helpful to the art of electromagnetic processing to provide efficient, and at the same time, accurate techniques for correcting electromagnetic waves during signal processing.

SUMMARY OF THE INVENTION

Embodiments of the invention include apparatus, methods and articles of manufacture for automatically adapting electromagnetic waves during signal processing. The invention may include a system for adaptively re-aligning a modulated output signal having an error component by generating a reference phase signal using a phase input signal; generating a sample phase signal from the output signal; comparing the reference and sample signals; and adaptively re-aligning any difference between the reference and sample signals to substantially reduce the error component.

The invention may also incorporate a sampling circuit for sampling the output signal to generate the sample signal; a digital phase locked loop for combining the phase input signal with a carrier wave to generate the reference signal and comparing them to generate a phase error signal; a reference filter for generating reference phase error information; a combining circuit for combining the phase error signal with the reference phase error information to generate a correction signal; and an adaptive gain control circuit for adaptively controlling gain in the correction signal to generate a final estimated error used to re-align the output signal with the phase input signal.

BRIEF DESCRIPTION OF THE DRAWINGS

The invention will be more fully understood from the following detailed description taken in conjunction with the accompanying drawings in which.

DETAILED DESCRIPTION OF THE INVENTION

Embodiments of the invention include apparatus, methods and articles of manufacture for adaptively correcting electromagnetic waves during signal processing. For illustration purposes, one embodiment comprises an adaptive phase re-alignment component tailored for tightly matching an input signal to a wideband phase modulator to predetermined wave characteristics. The system disclosed herein may be used, however, with a wide range of wave processing systems and is not limited to phase correction or phase modulation systems. The system may also be used in a wide range of applications, such as, for example, receivers, transducers, and the like, and is not limited to transmitters.

The term "signal" as is used herein should be broadly construed to include any manner of conveying data from one place to another, such as, for example, an electric current or electromagnetic field, including without limitation, a direct current that is switched on and off or an alternating-current or electromagnetic carrier that contains one or more data streams. Data, for example, may be superimposed on a carrier current or wave by means of modulation, which may be accomplished in analog or digital form. The term "data" as used herein should also be broadly construed to comprise any type of intelligence or other information, such as, for example and without limitation, audio, such as voice, text and/or video, etc.

Figure 1:
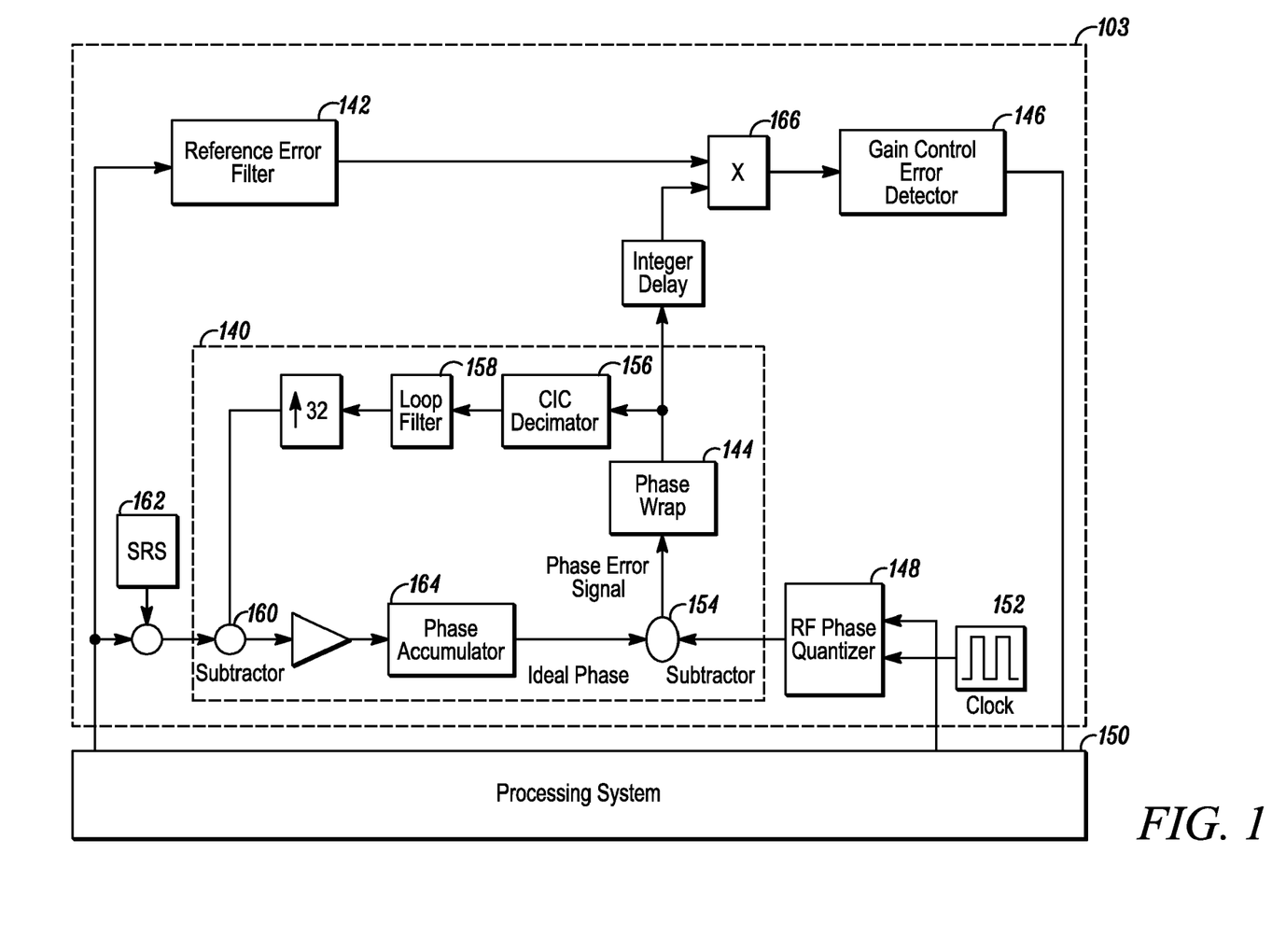
FIG. 1 is a schematic diagram illustrating an adaptive phase re-alignment circuit.

An embodiment of an adaptive phase re-alignment system is illustrated in detail in FIG. 1. As should be understood, other suitable embodiments for the invention may also be utilized where desired. In this embodiment, adaptive phase re-alignment component 103 may include, for example, a radio frequency ("RF") phase quantizer 148, a digital phase lock loop (DPLL) 140, a reference error filter 142, and an adaptive gain control 146. This embodiment may be used, for example, to adaptively re-align the phase characteristic of a signal wave as it is being processed, without the need to disrupt operation of the processing system to calibrate the system components.

DPLL 140 may operate, for example, to align the phase of a phase modulated RF carrier wave with a predetermined "ideal" (i.e., correct) phase by removing any constant phase offset and/or random frequency drift in the processed signal. For example, where processing system 150 is a wideband phase modulation system, a phase modulated output signal may be represented by the equation:

$$\text{RF\_VCO\_Out} = \cos\left(\omega_c t + K_{tot}(1+\delta)\sum_n d_n \int_{-\infty}^{t-nT} g(\tau)d\tau + \omega_{drift}t + \Phi\right) \quad \text{Eq. 1}$$

where $\omega_c$ is center frequency or channel of the carrier wave, $K_{tot}(1+\delta)$ is the gain error of the processing system, $\Phi$ is any constant phase offset and $\omega_{drift}$ is any random frequency drift in the modulated signal.

An "ideal" reference carrier wave signal may be produced by combining the phase data from a baseband input signal with the center frequency of the carrier wave signal channel, $\omega_c$, calculated by a standard reference source 162. In one embodiment, the baseband input signal may be passed through low pass filter 168 having a response determined by the frequency response of processing system 150 in producing the processed signal.

While this carrier wave signal may be a digital value representing the fractional value of the channel in this embodiment, those of ordinary skill in the art will appreciate that it is not limited thereto. The number of bits used to produce the center channel frequency is not particularly limited.

This signal may be used to drive phase accumulator 164 in a conventional manner to produce a reference signal representative of the "ideal" phase for the processed output signal (a phase modulated signal in this example). Those of ordinary skill in the art will appreciate that the number of bits used in phase accumulator 164 is not particularly limited. In the illustrated embodiment, the resolution of phase accumulator 164 (i.e, the number of bits) may be equal to that of quantizer 148.

Quantizer 148, in turn, may be used to sample the signal being outputted from the processing system 150, such as by digitally sampling a phase modulated RF carrier wave signal to extract the baseband phase information for the signal. This function may be accomplished in any number of ways, such as by using an A/D converter, which would output a digital signal from quantizer 148 that contains the phase information of the modulated signal. Quantizer 148 may use a timing signal from clock 152 in a conventional manner. The timing signal from clock 152 may also be incorporated into the digital signal outputted from quantizer 148.

In one embodiment, quantizer 148 may include a digital prescaler to divide down the RF carrier signal (e.g., by 4), and to simultaneously provide I and Q data. The I,Q data for the phase information in the RF output signal may be quantized to two bits, one for each channel, although the invention is not limited thereto. In addition, the RF carrier signal may be sampled directly to increase the resolution of the sampled signal, thus reducing the impact of quantization noise on the sampled signal. For example, the RF output signal may be combined with the I,Q data to produce a three bit sampled signal i.e., identifying eight phase sectors. In an alternate embodiment, the rising and falling edges of the RF output signal may be used to generate two sets of I and Q signals (offset by half cycle) which similarly increases the resolution of the sampled signal to eight phase sectors. As noted above, the same level of resolution maybe also be used in phase accumulator 164.

This digital output from quantizer 148 may then be inputted to DPLL 140 for comparison with the "ideal" reference phase signal. For example, this digital signal may be subtracted from the "ideal" reference phase signal at subtractor 154. Subtractor 154 may digitally sum these two signals to produce an output that is thus a phase error signal, representative of the difference, or error, between the processed output signal wave inputted into quantizer 148 and the predetermined reference "ideal" signal.

The phase wrap 144 ensures that the phase difference does not exceed 2 pi radians (−pi to +pi). Angles that exceed +/−pi are mapped to corresponding angles in that range, as is commonly known to those skilled in the art. In one embodiment, carrier phase wrap 144 may comprise a circuit which performs a modulo 2 operation on the phase error signal if phase error signal has been scaled down to be between ±1. The circuit may ignore any overflow bits. This embodiment allows for the modulo 2 operation to be used to flip errors outside this range in sign and add them (e.g., a value of 1.5 becomes −0.5 and a value of −1.5 becomes +0.5).

The output of phase wrap 144 may be passed to decimator 156, which may be used to reduce the sample rate of the DPLL (e.g., by 32, although not limited thereto). Decimator 156 may comprise, for example a cascaded integrator-comb filter (CIC) type, but is not limited thereto. Decimator 156 then feeds loop filter 158, which may comprise, for example an FIR filter having a predetermined response calculated for use with the signal being processed. The feedback output signal of loop filter 158 may then be combined with the "ideal" reference signal at subtractor 160.

This process allows DPLL 140 to detect and eliminate both the constant phase offset and small carrier frequency variations in the ideal carrier phase and frequency that may occur.

Reference error filter 142 may be operated to produce a reference phase-error waveform using the phase data of the input signal being processed by the system. This reference error signal may serve as a basis function for the measured true phase error. The true phase error signal from phase wrap 144 may be projected onto this reference error signal at multiplier 166 to produce an estimated gain error of the PLL. Those of ordinary skill in the art will appreciate that a delay may be used to align the true phase error signal to the reference error signal samples.

The estimated gain error signal may then be passed, for example, to adaptive gain control and filter 146, which produces the final estimated gain error ($\delta$ in sample equation 1) to be used to adaptively re-align the phase of the processed output signal (RF_VCO_Out in sample equation 1). For example, gain may be varied in fixed time steps to achieve fast settling time of the final estimated gain error. In another example, the gain applied in 146 may be adaptively varied based upon the measured error signal. These are advantageous in some modulation schemes, such as CDMA, which have specific, faster requirements for the settling time of the signal.

In this way, adaptive phase re-alignment component 103 may be used to re-align the phase of the processed signal. Adaptive phase re-alignment component 103 may measure the output phase of the processing system and compare it to a theoretically perfect ("ideal") version that is derived from the phase and frequency data of the input signal being processed. The result of this comparison is used to adaptively adjust the processing system, eliminating the need to manually calibrate the system components. One example of this is described in more detail below. This feedback system operates to minimize the error in the processed signal.

Figure 2:
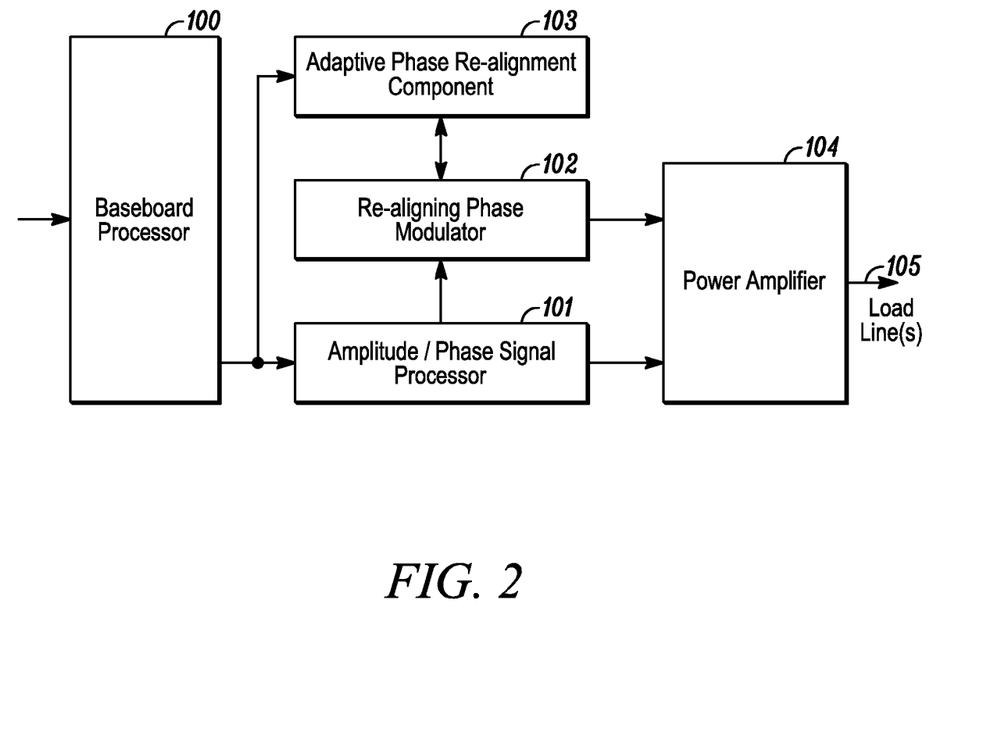
FIG. 2 is a block diagram illustrating a transmitter.

For purposes of illustration of the operation of the invention, a signal transmitter is disclosed in FIG. 2, which incorporates an adaptive phase re-alignment system used in connection with a wideband phase modulator in accordance with an embodiment of the invention. The transmitter 10 illustrated in FIG. 2 may include, for example, a baseband processor 100 adapted for receiving an input signal, an amplitude/phase signal processor 101, wideband modulator 102, adaptive phase re-alignment component 103, power amplifier 104 and one or more load lines 105 connected to an antenna.

Baseband processor 100 may be, for example, a digital signal processor capable of generating a power control signal and a data control signal in response to the input signal, which may be, for example, a baseband signal. The data control signal may be passed from baseband processor 100 to amplitude/phase signal processor 101. In one embodiment, I,Q data may be converted by amplitude/phase signal processor 101 into an analog or digital data control signal that contains the amplitude wave characteristic of the input signal ("$A_m$"), and an electromagnetic signal that contains the phase wave characteristic of the input signal ("$A_p$").

The phase characteristic, $A_p$, in turn, may be processed separately and then applied to power amplifier 104. For example, phase signal $A_p$ may be passed to wideband phase modulator 102, where the phase characteristic information may be modulated onto a carrier signal in the manner previously described and then sent to power amplifier 104, where it may be regulated by the data control signal $A_m$ in order to generate an output signal for transmission that is an amplified version of the input signal.

Adaptive phase re-alignment component 103 may receive the phase and frequency information from amplitude/phase signal processor 101, as well as the signal outputted from wideband phase modulator 102. The phase/frequency information may be used in the manner described above to determine an "ideal" phase signal. The output signal from phase modulator 102 may be sampled and compared with this "ideal" phase signal to create a feedback signal for re-aligning phase modulator 102, as described in more detail below.

Figure 3:
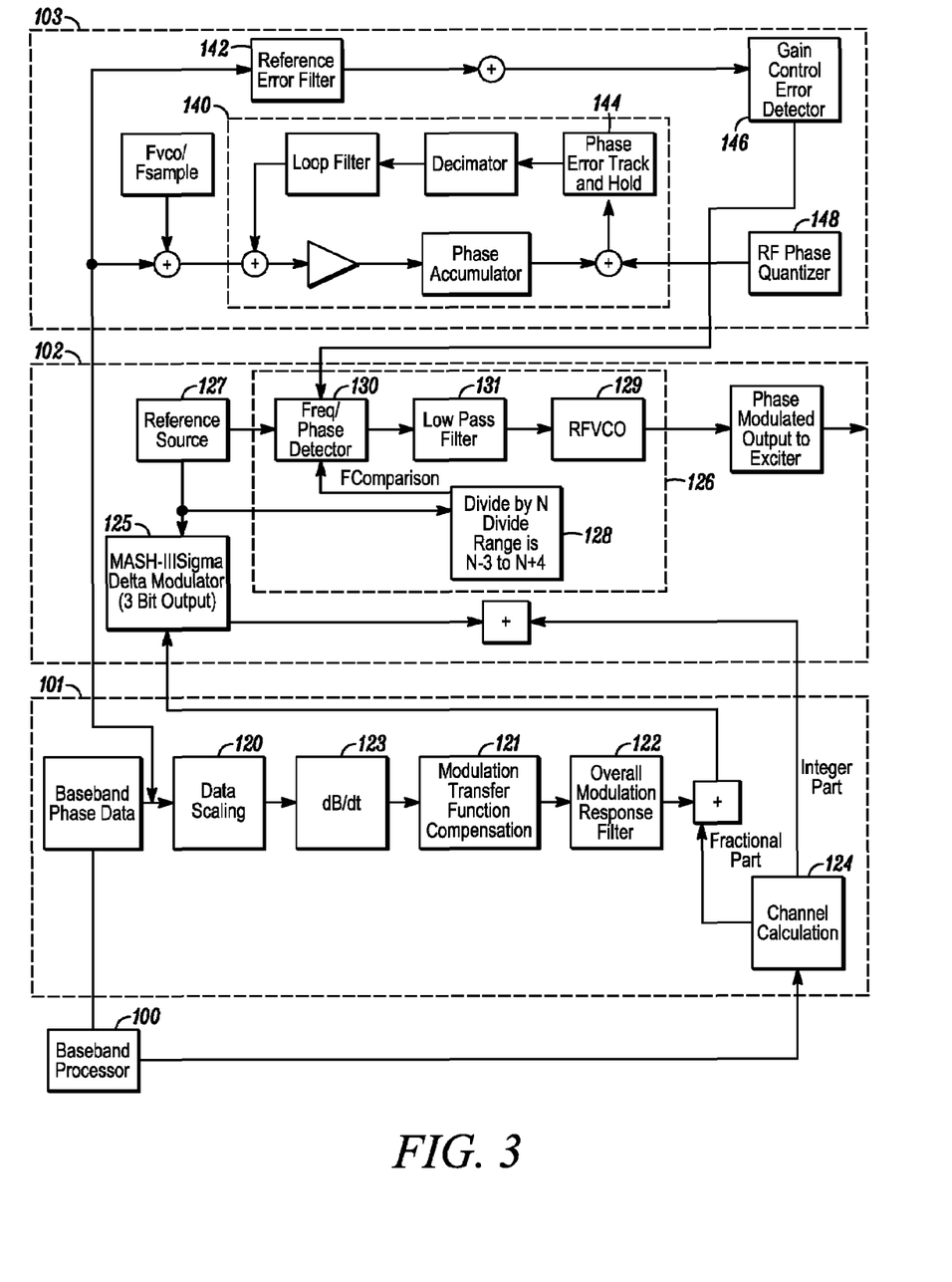
FIG. 3 is a block diagram illustrating a phase modulation system.

An embodiment of a phase modulation system incorporating the invention is further illustrated in FIG. 3. In one embodiment, for example, I,Q data may be converted by amplitude/phase signal processor 101 into a polar signal to create an analog or digital data control signal that contains the amplitude wave characteristic of the input signal ("$A_m$"), and an electromagnetic signal that contains the phase wave characteristic of the input signal ("$A_p$").

For example, a rectangular to polar converter may be used to output polar coordinates in the form (R, theta) where the R coordinate represents the amplitude characteristic of the wave, and the theta coordinate represents the phase characteristic of the wave.

The amplitude characteristics, $A_m$, of the original input signal may be modulated as a control signal, such as a series of digital pulses comprising a digital word of varying lengths in various embodiments, which is used to control the amplification in power amplifier 104 of the signal outputted from phase modulator 102. The phase data from the input signal, $A_p$, may, in turn, be first passed through a data scaling processor 120, which scales amplitude of the data signal appropriately. The change in signal amplitude produced by data scaling processor 120 may be calculated to compensate for any unwanted gain that may be introduced in the output signal from wideband modulator 102. The scaling of the signal may be accomplished through any conventional means compatible with the data format. For example, if the phase data signal is digital, scaling may be accomplished by digital processing. In this embodiment, wideband modulator 102 is inherently a frequency modulator, so that translation of data for frequency and phase representations of the data occurs via dθ/dt 123 shown in FIG. 3.

The phase component signal may then be passed through a modulation compensation (equalization) filter 121, which is calculated to have a magnitude and phase response that is the inverse of the closed loop response of wideband modulator 102. As will be discussed below, in some instances, modulator 102 has an inherent design bandwidth to minimize noise in the signal. Limiting of the bandwidth in this manner, however, may cause a roll-off, that is, diminution, of the higher frequency components of the signal. Equalization filter 121 and overall modulation response filter 122 compensates for roll-off by increasing the gain of these higher frequency components, thus producing a more even (flattened) frequency response for the system and effectively extending the modulation bandwidth of wideband modulator 102.

The equalization filter 121 is preferably implemented digitally, using a digital signal processor, although not limited thereto, and may be either a FIR (finite impulse response) or IIR (infinite frequency response) filter, as examples. The phase component data may also be passed through overall modulation response filter 122, which is calculated to set the overall passband response of wideband modulator 102 (e.g., 4 MHz). Overall modulation response filter 122, similar to equalization filter 121, may be an analog or digital FIR or IIR filter. Functionally, filters 121 and 122 may be combined into a single filter where desired.

In the embodiment disclosed herein, the baseband input signal may be modulated onto a carrier wave of a selected center frequency in wideband modulator 102. The center frequency about which a given signal is to be modulated is determined by a channel calculation, by which the carrier wave frequency (e.g., 1880 MHz) is divided by the frequency of the reference source to establish a channel for the signal.

In this embodiment, the channel calculation yields a number that has an integer part and a fractional part. As shown in FIG. 3, channel calculator 124 received the channel number from baseband processor 100 and determines a selectable non-whole number (e.g., 23.5 to 24.5) by which the carrier wave of wideband modulator 102 is to be divided, allowing the selection of a channel in which the phase data signal is to be modulated. The fractional portion of this number may then combined with the data signal, which is passed to sigma delta modulator (SDM) 125 in wideband modulator 102. (This fractional portion may also be used to provide channel information to adaptive phase re-alignment component 103, as well).

SDM 125 may be used in connection with phase-locked loop (PLL) 126 to achieve wideband modulation of the input signal onto a carrier wave. SDM 125 serves to randomize and oversample the inputted phase data, with the average of multiple samples of the output being equal to the input. The SDM 125 in this embodiment operates in a manner so that inherent quantization noise from the digitizing process may be frequency shaped, so that at the desired frequencies, the noise is low.

SDM 125 may comprise, for example, a series of adders/accumulators and feedback components for inputting the fractional phase/channel number data (which may be an analog or digital signal) and outputting a digitized series of integers that correspond to the fractional input. The SDM 125 may be configured so that the input range is sufficient for phase modulation data as well as the fractional portion of the channel number. For example, SDM 125 may be a three bit system, which is thus capable of producing eight different output numbers (e.g., −3, −2, −1, 0, 1, 2, 3, and 4), although as should be understood, SDM 125 may comprise any desired number of bits or elements. SDM 125 may produce four output integers for each sample of the input, yielding an oversampling rate of four times the input. Sampling of the input modulating data in SDM 125 in this manner may introduce noise on the input modulating signal. Any such noise may be filtered by low-pass loop filter 131 in PLL 126. The circuit topology for SDM 125 is not particularly limited, but may include a MASH III topology or a 3rd Order Loop topology, for example. As should be understood, however, other suitable circuit topologies may also be utilized for the SDM 125 where desired.

The output of SDM 125 in the illustrated embodiment may then be combined with the integer portion of the channel number received from channel calculator 124. In the example discussed herein, the combination would produce a number from 20 to 28. The combination of the fractional and integer portions of the channel number may be inputted to divider 128 in this embodiment and used to lock PLL 126 to the desired RF carrier.

The PLL 126 in the illustrated embodiment may be used to modulate a wave signal synthesized by an RF carrier wave signal source, such as carrier wave source 129, using the phase portion of the input signal. Carrier wave source 129 may be any source of electromagnetic waves that is capable for producing a carrier wave, such as a radio frequency voltage-controlled oscillator (VCO).

The frequency of reference source 127 (or a division thereof by some number) may be compared with the output frequency of carrier wave source 129, divided by the series of numbers received by divider 128 from SDM 125 and channel calculator 124. Reference source 127 may comprise a VCO of a constant or substantially constant frequency or may be derived from a source at another frequency.

Phase-frequency detector (PFD) 130 may be used to compare the relative phases of the two signals and then output a signal that is proportional to the difference (phase shift) between them. This output signal may be utilized to adjust the frequency of carrier wave source 129, so that the phase difference measured at PFD 130 is substantially close and preferably equal to zero. Hence, the phase of the signal is locked by the feedback loop to prevent unwanted drift of the signal phase, due to variations in the phase and frequency of carrier wave source 129.

A feedback signal from carrier wave source 129 may be passed through divider 128, with the division ratio of the divider controlled by the series of numbers representing the phase component information received from SDM 125 and the channel information received from channel calculator 124. The resulting signal may be passed to PFD 130, where it is compared with the signal from reference source 127, as noted above. This combined signal may be passed through low-pass loop filter 131, and combined with the carrier wave signal of carrier wave source 129.

SDM 125 is being utilized to perform wideband modulation of the phase data input to SDM 125. Since the phase data input to SDM 125 may not be constant, synchronizing SDM 125 to the output of divider 128 may introduce a frequency offset that is dependent on the modulation signal. Accordingly, it may be desired in certain embodiments that SDM 125 and divider 128 be synchronized by reference source 127

Before the equalization filter 121, the phase characteristic information $A_p$ may be sent to adaptive phase re-alignment component 103 to be used in phase re-alignment in the manner previously described. In one embodiment, the phase characteristic information $A_p$ is passed through Reference Error Filter 142, which is calculated based upon the transfer function of phase modulator 102 and the equalization filter 121.

For example, adaptive phase re-alignment component 103 may be used to dynamically adjust the PLL response, to ensure that the equalization filter 121 and the closed loop response of the PLL 126 are closely matched. Adaptive phase re-alignment component 103 may measure the output phase of wideband modulator 102 and compare it to a theoretically perfect version that is derived from the baseband input data and the center frequency information received from channel calculator 124. The result of this comparison is used to adjust the loop gain of PLL 126 in wideband modulator 102. This feedback system operates to minimize the error in the transmitted signal. Adaptive phase re-alignment component 103 preferably operates while the PLL is in service and reduces the need for manual calibration of the system.

In some embodiments, for example, with certain transmitter, receiver, and transceiver embodiments, the components described herein may be specialized for particular input signals, carrier waves and output signals, e.g. various types of cell phones, such as CDMA, CDMA2000, W-CDMA, GSM, TDMA, as well as various other types of devices, both wired and wireless, e.g. Bluetooth, 802.11a, -b, -g, radar, 1×RTT, radios, GPRS, computers and computer or non-computer communication devices, handheld devices, etc. The modulation scheme that may be used in implementations of the invention is not limited and may include, for example, GMSK, which is used in GSM; GFSK, which is used in DECT & Bluetooth; 8-PSK, which is used in EDGE; OQPSK & HPSK, which are used in IS-2000; p/4 DQPSK, which is used in TDMA; and OFDM, which is used in 802.11.

Embodiments may utilize both analog and digital components, where desired, insofar as these embodiments manipulate waves and signals requiring both. For example, cell phone embodiments may utilize both analog and digital components. Various types of system architectures may also be utilized for constructing the embodiments. For example, embodiments or various components may be provided on a semiconductor device where desired, such as an integrated circuit or an application-specific integrated circuit composition; some examples include silicon (Si), silicon germanium (SiGe) or gallium arsenide (GaAs) substrates.

Figure 4:
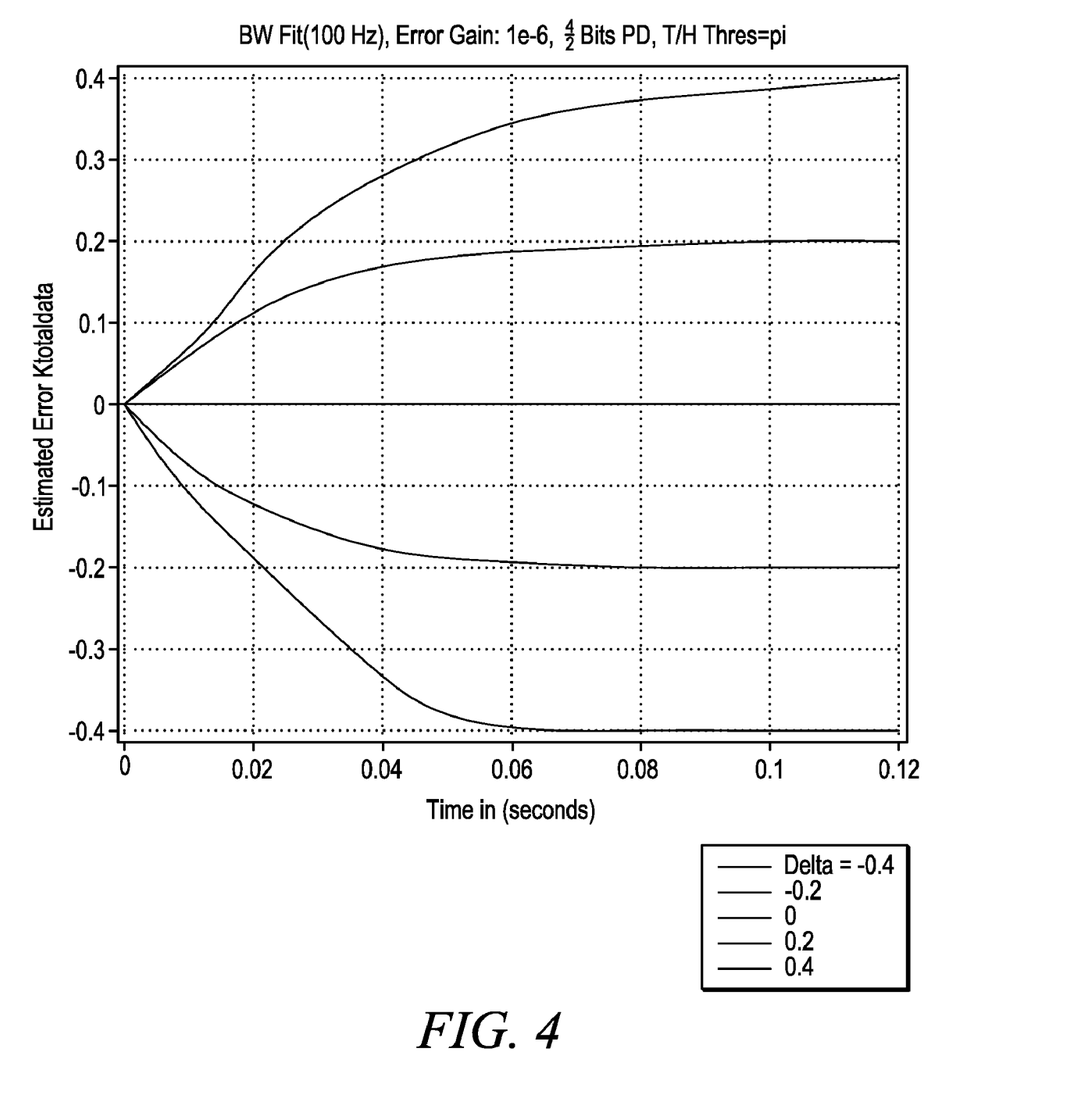
FIG. 4 is a chart illustrating simulated performance results for the embodiment of the invention disclosed herein.

FIG. 4 illustrates performance information for a computer generated model of the above-described embodiment of the invention. In this example, adaptive phase re-alignment component 103 was configured to have bandwidth of 100 Hz for loop filter 158, an error gain factor of $1 \times e^{-6}$, a 4 bit accumulator and quantizer 164, and a 2 bit phase quantizer, 148. Adaptive phase re-alignment was simulated using a phase delta gain error factor of −0.4, −0.2, 0, +0.2, and +0.4. As shown in FIG. 4, the system corrected for these gain errors up to about 40% with about 0.1% residual error.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. One of ordinary skill in the art will accordingly appreciate that embodiments of the invention or various components and/or features thereof may be entirely comprised of hard- ware, software and/or may be a combination of software and hardware. Accordingly each of the blocks of the drawings, and combinations of blocks of the drawings, may be embodied in many different ways, as is well known to those of skill in the art. Accordingly, the foregoing description is by way of example only, and not limiting. The invention is limited only as defined in the following claims and equivalents thereto.

What is claimed is:

1. A method of adaptively re-aligning a modulated output signal having a corresponding phase input signal, where said modulated output signal has an error component, said method comprising the steps of:
   combining said phase input signal with at least a portion of a carrier wave to generate a reference phase signal;
   generating a sample phase signal from said modulated output signal;
   comparing said reference phase signal with said sample phase signal; and
   adaptively re-aligning any difference between said reference phase signal and said sample phase signal based upon said comparison to substantially reduce said error component.

2. A method as in claim 1 further comprising:
   selecting a carrier frequency channel for said reference phase signal, wherein said sample phase signal incorporates at least a portion of said channel selection.

3. A method as in claim 2, wherein said channel selection is designated by a number having a fractional part and an integer part, wherein said fractional part is used in generating said reference phase signal.

4. A method as in claim 1, wherein said modulated output signal is generated by phase and/or frequency modulating said phase input signal with a carrier signal using a phase modulator.

5. A method as in claim 4, wherein said phase modulator comprises an equalization filter, an overall modulation response filter, and a wideband phase modulator.

6. A method as in claim 1, further comprising the steps of:
   quantizing and sampling said modulated output to generate said sample phase input signal;
   comparing said sample phase input signal with said reference phase signal to generate a phase error signal;
   passing said phase input signal through a reference error filter to generate reference phase error information;
   combining said phase error signal with said reference phase error information to generate a correction signal;
   adaptively controlling gain of said correction signal to generate a final estimated error; and
   using said final estimated error to re-align said modulated output signal with said phase input signal.

7. A method as in claim 6, wherein said quantizing of said modulated output signal comprises prescaling and generation of I and Q signals from said modulated output signal.

8. A method as in claim 7, wherein said modulated output signal is divided by four and digitally sampled to one bit of resolution each for said I and Q signals.

9. A method as in claim 7, wherein a carrier wave for said I and Q signals is digitally sampled at one bit of resolution.

10. A method as in claim 6, wherein both rising and falling edges of said modulated output signal may be used to generate two sets of I and Q signals offset by half cycle, which increases the resolution of said sample phase signal to eight phase sectors.

11. A method as in claim 6, wherein said reference phase signal and said sample phase signal are scaled to a range of ±1 and said comparison includes a modulo 2 computation.

12. A method as in claim 6, further comprising the step of passing said phase input signal through a filter prior to said combining with said carrier wave, wherein said filter has a frequency response calculated based upon an overall modulation response of a phase modulator used to generate said modulated output signal.

13. A method as in claim 12, wherein said reference error filter has a frequency response calculated based upon an estimation of said frequency response of said phase modulator.

14. A method as in claim 6, wherein said adaptive gain control is accomplished by using fixed time steps to said final estimated error.

15. A method as in claim 6, wherein said final estimated error is used to control phase/frequency detector gain of a phase modulator used to generate said modulated output signal.

16. An apparatus for adaptively re-aligning a modulated output signal having a corresponding phase input signal, where said modulated output signal has an error component, said apparatus comprising:
    an adaptive re-alignment processor for generating a reference phase signal by combining said phase input signal with at least a portion of a carrier wave, generating a sample phase signal from said modulated output signal, comparing said reference phase signal with said sample phase signal; and adaptively re-aligning any difference between said reference phase signal and said sample phase signal based upon said comparison to substantially reduce said error component.

17. An apparatus of claim 16, further comprising:
    a carrier frequency generator for generating a carrier frequency channel for said reference phase signal, wherein said sample phase signal incorporates at least a portion of said carrier frequency channel.

18. An apparatus as in claim 17, wherein said channel selection is designated by a number having a fractional part and an integer part, wherein said fractional part is used in generating said reference phase signal.

19. An apparatus as in claim 16, wherein said signal processor comprises a phase and/or frequency modulator for modulating said phase input signal with a carrier signal.

20. An apparatus as in claim 19, wherein said phase and/or frequency modulator comprises an equalization filter, an overall modulation response filter, and a wideband phase modulator.

21. An apparatus of claim 16, further comprising:
    a sampling circuit for quantizing and sampling said modulated output to generate said sample phase input signal;
    a comparison circuit for comparing said sample phase signal with said reference phase signal to generate a phase error signal;
    a reference filter for receiving said phase input signal and generating reference phase error information;
    a combining circuit for combining said phase error signal with said reference phase error information to generate a correction signal; and
    an adaptive gain control circuit for adaptively controlling gain in said correction signal to generate a final estimated error, and for using said final estimated error to re-align said modulated output signal with said phase input signal.

22. An apparatus as in claim 21, wherein said quantizer circuit comprises a prescaling circuit for prescaling and generation of I and Q signals from said modulated output signal.

23. An apparatus as in claim 22, wherein said quantizing circuit divides said modulated output signal by four and digitally sampled and quantized to the resolution of eight phase sectors.

24. An apparatus as in claim 22, wherein said carrier wave for said I and Q signals is digitally sampled at one bit of resolution.

25. An apparatus as in 24, wherein both rising and falling edges of said modulated output signal may be used to generate two sets of I and Q signals offset by half cycle, which increases the resolution of said sample phase signal to eight phase sectors.

26. An apparatus as in claim 21, wherein said sample phase signal and said reference phase signal are scaled to a range of ±1 and said comparison circuit includes a modulo 2 computation.

27. An apparatus as in claim 21, further comprising an input filter for receiving said phase input signal prior to said combining with said carrier wave, wherein said input filter has a frequency response calculated based upon an overall modulation response of said phase and/or frequency modulator.

28. An apparatus as in of claim 21, wherein said reference error filter has a frequency response calculated based upon an estimation of a frequency response of said phase and/or frequency modulator.

29. An apparatus as in claim 21, wherein said adaptive gain control of said gain is accomplished by using fixed time steps to adjust gain to achieve a targeted settling time of said final estimated error.

30. An apparatus as in claim 21, wherein said final estimated error is used to control phase/frequency detector gain of said phase modulator.

31. An apparatus as in claim 21, wherein said first combining circuit and said comparison circuit comprise a digital phase locked loop.

32. An apparatus for adaptively re-aligning a phase portion of an output signal from a phase and/or frequency modulator, wherein a phase input signal is provided to a phase modulator for modulating a carrier wave to produce said output signal, said apparatus comprising:
   a quantizing circuit for quantizing and sampling said output signal to generate a sample phase signal;
   a digital phase locked loop for combining said phase input signal with said carrier wave to generate a reference phase signal, and for comparing said sample phase signal with said reference phase signal to generate a phase error signal;
   the said phase error signal will be filtered to generate a digital phase locked loop feedback error signal; and
   a combining circuit for combining said phase input signal with said feedback error signal to generate a corrected reference phase signal.

33. An apparatus of claim 32, wherein said quantizer circuit comprises a prescaling circuit for prescaling said output signal and said output phase information includes I,Q data carrier wave information for said output signal.

34. An apparatus of claim 33, wherein said quantizing circuit divides said output signal by four and digitally samples said output signal to one bit of resolution each for said I,Q data.

35. An apparatus of claim 33, wherein said carrier wave is digitally sampled at one bit of resolution.

36. An apparatus of claim 32, wherein said output phase information and said reference modulation information are scaled to a range of ±1 and said digital phase locked loop includes a modulo 2 computation of values for said output phase information and said reference modulation information.

37. An apparatus of claim 32, further comprising an input filter for receiving said input phase prior to said combining with said carrier wave, wherein said input filter has a frequency response calculated based upon an output frequency response of said phase and/or frequency modulator.

38. An apparatus of claim 32, wherein said reference error filter has a frequency response calculated base upon an estimation of said frequency response of said phase and/or frequency modulator.

39. An apparatus of claim 32, wherein said adaptive gain control of said gain in said modulation of said carrier wave by said input signal is accomplished by using fixed time steps to adapt gain variance for a targeted settlement time of said correction signal.

* * * * *